(12) United States Patent
Zhu et al.

(10) Patent No.: US 8,909,533 B2
(45) Date of Patent: Dec. 9, 2014

(54) METHOD AND APPARATUS FOR PERFORMING AND CONTROLLING SPEECH RECOGNITION AND ENROLLMENT

(75) Inventors: Ning Zhu, Shenzhen (CN); Weiwei Yang, Xian (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 127 days.

(21) Appl. No.: 13/315,966

(22) Filed: Dec. 9, 2011

(65) Prior Publication Data

US 2012/0078637 A1 Mar. 29, 2012

Related U.S. Application Data

(63) Continuation of application No. PCT/CN2010/073881, filed on Jun. 12, 2010.

(30) Foreign Application Priority Data

Jun. 12, 2009 (CN) .......................... 2009 1 0086974

(51) Int. Cl.

| | | |
|---|---|---|
| *G10L 21/00* | (2013.01) | |
| *G10L 15/06* | (2013.01) | |
| *G10L 15/00* | (2013.01) | |
| *H04M 1/64* | (2006.01) | |
| *H04M 3/00* | (2006.01) | |
| *H04L 29/06* | (2006.01) | |
| *G06F 9/00* | (2006.01) | |
| *G06F 21/00* | (2013.01) | |

(52) U.S. Cl.
CPC .......... *H04L 65/1043* (2013.01); *G10L 15/063* (2013.01); *H04L 65/1026* (2013.01); *H04L 65/103* (2013.01)

USPC ........ 704/270.1; 704/270; 704/273; 704/275; 704/257; 713/156; 713/186; 379/88.17; 379/88.01; 379/88.22; 379/265.02; 726/12

(58) Field of Classification Search
USPC ........ 704/270, 275, 257, 273, 270.1, 10, 254, 704/235, 241; 713/156, 186; 709/224; 379/265.02, 88.17, 88.01, 88.22; 726/12

See application file for complete search history.

(56) References Cited

U.S. PATENT DOCUMENTS 6,895,084 B1 * 5/2005 Saylor et al. ............... 379/88.22
7,149,287 B1 * 12/2006 Burger et al. .............. 379/88.17

(Continued)

FOREIGN PATENT DOCUMENTS

CN 1575574 A 2/2005
CN 1585386 A 2/2005

(Continued)

OTHER PUBLICATIONS

Written Opinion of the International Searching Authority issued in corresponding PCT Patent Application No. PCT/CN2010/073881, mailed Sep. 16, 2010.

(Continued)

*Primary Examiner* — Paras D Shah
*Assistant Examiner* — Neeraj Sharma
(74) *Attorney, Agent, or Firm* — Brinks Gilson & Lione (57) ABSTRACT

A method and an apparatus for performing and controlling speech recognition and enrolment are provided. The method for performing speech recognition and enrolment includes: receiving a Speech Enrolment Start Request and a Speech Recognition Request sent from a media gateway controller (MGC); performing speech recognition and enrolment according to the Speech Enrolment Start Request and the Speech Recognition Request, and obtaining a recognition and enrolment result; and feeding back the recognition and enrolment result to the MGC.

12 Claims, 3 Drawing Sheets

(56) References Cited

U.S. PATENT DOCUMENTS

| | | | |
|---|---|---|---|
| 7,398,208 B2* | 7/2008 | Kammerer | 704/241 |
| 7,503,065 B1* | 3/2009 | Packingham et al. | 726/12 |
| 7,715,547 B2* | 5/2010 | Ibbotson et al. | 379/265.02 |
| 8,010,367 B2* | 8/2011 | Muschett et al. | 704/273 |
| 8,155,956 B2* | 4/2012 | Cho et al. | 704/235 |
| 8,229,753 B2* | 7/2012 | Galanes et al. | 704/270.1 |
| 8,332,223 B2* | 12/2012 | Farrell et al. | 704/246 |
| 8,504,370 B2* | 8/2013 | Hong et al. | 704/270 |
| 8,533,485 B1 | 9/2013 | Bansal et al. | 713/186 |
| 8,620,658 B2* | 12/2013 | Nakade et al. | 704/257 |
| 8,731,925 B2* | 5/2014 | Da Palma et al. | 704/251 |
| 8,825,482 B2* | 9/2014 | Hernandez-Abrego et al. | 704/246 |
| 2002/0080927 A1* | 6/2002 | Uppaluru | 379/88.01 |
| 2002/0087858 A1* | 7/2002 | Oliver et al. | 713/156 |
| 2003/0009337 A1 | 1/2003 | Rupsis | |
| 2004/0010582 A1* | 1/2004 | Oliver | 709/224 |
| 2004/0111269 A1* | 6/2004 | Koch | 704/275 |
| 2004/0127472 A1 | 7/2004 | Jerdan | |
| 2005/0015251 A1 | 1/2005 | Pi et al. | |
| 2005/0108013 A1* | 5/2005 | Karns | 704/254 |
| 2005/0276391 A1 | 12/2005 | Ibbotson et al. | |
| 2007/0083374 A1* | 4/2007 | Bates et al. | 704/257 |
| 2007/0129949 A1 | 6/2007 | Alberth et al. | |
| 2007/0185718 A1* | 8/2007 | Di Mambro et al. | 704/273 |
| 2009/0055879 A1 | 2/2009 | Wang et al. | |
| 2010/0185438 A1* | 7/2010 | De La Cruz | 704/10 |

FOREIGN PATENT DOCUMENTS

| | | |
|---|---|---|
| CN | 1953447 A | 4/2007 |
| CN | 1968402 A | 5/2007 |
| CN | 101192925 A | 6/2008 |
| CN | 101409074 A | 4/2009 |
| WO | WO 2010/142254 A1 | 12/2010 |

OTHER PUBLICATIONS

Office Action issued in corresponding Chinese Patent Application No. 200910086974.5, mailed Aug. 30, 2011.

Extended European Search Report issued in corresponding European Patent Application No. 10785767.4, mailed Mar. 1, 2012.

Telecommunication Standardization Sector—Editor H.248.MRCP, "Initial Draft Review of New ITU-T Rec. H.248.MRCP "Media Resource Control Enhancement Packages"" Study Group 16, TD 107(WP 2/16) Geneva, Jan. 27-Feb. 6, 2009.

* cited by examiner

METHOD AND APPARATUS FOR PERFORMING AND CONTROLLING SPEECH RECOGNITION AND ENROLLMENT

CROSS-REFERENCE TO RELATED APPLICATIONS

This application is a continuation of International Application No. PCT/CN2010/073881, filed on Jun. 12, 2010, which claims priority to Chinese Patent Application No. 200910086974.5, filed on Jun. 12, 2009, both of which are hereby incorporated by reference in their entireties.

FIELD

The present disclosure relates to the field of communication technologies, and in particular, to a method and an apparatus for performing and controlling speech recognition and enrolment.

BACKGROUND

With the constant development of network convergence, a next generation network (NGN) emerges. The NGN has an integrated open network architecture, which, on the basis of the packet technology, uses a soft switch as the core, and is capable of providing speech, data, video, and multimedia services. The NGN represents the development direction of communication networks.

Figure 1:
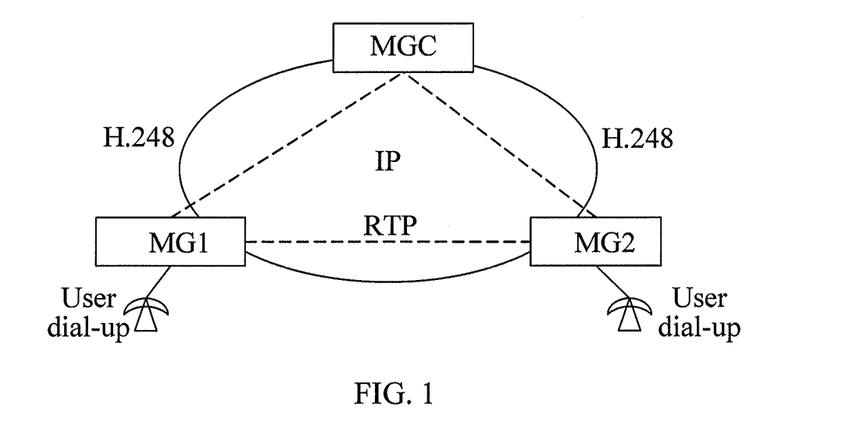
FIG. 1 is a schematic structure diagram of an NGN architecture in the prior art.

FIG. 1 is a schematic structure diagram of an NGN architecture in the prior art. As shown in FIG. 1, the NGN architecture includes a media gateway (MG) and a media gateway controller (MGC). The MGC is configured to manage the call status and control the bearer resources of the MG. The MG is configured to convert a media stream from one format to another format. For example, the MG converts a media stream in an E1 timeslot in a circuit switched network into a Realtime Transport Protocol (RTP) media stream in an Internet Protocol (IP) network, and under the signaling control of the MGC, establishes, modifies, or releases the media stream, and manages resources. In addition, the MG can implement the function of network address translation. In the NGN architecture shown in FIG. 1, speaker-dependent speech recognition may be implemented. During the implementation, the MG stores a uniform resource identifier (URI) in advance, where the URI corresponds to pronunciation grammars and pronunciation characteristics of a speaker. When the MG receives a speech recognition request that the speaker sends through a user equipment (UE), the MG may perform recognition on the speech of the speaker according to the URI, so as to convert a speech signal into a signal that can be recognized by a machine.

During the implementation of the present disclosure, the inventors find that the prior art has at least the following problem: the existing MG cannot implement speech recognition and enrolment.

SUMMARY

Embodiments of the present disclosure provide a method and an apparatus for performing and controlling speech recognition and enrolment to solve the problem in the prior art that the MG cannot implement speech recognition and enrolment, so that in an architecture where the MG is separate from the MGC, the MG can implement speech recognition and enrolment under the control of the MGC.

An embodiment of the present disclosure provides a method for performing speech recognition and enrolment, including: receiving a Speech Enrolment Start Request and a Speech Recognition Request from an MGC; performing speech recognition and enrolment according to the Speech Enrolment Start Request and the Speech Recognition Request, and obtaining a recognition and enrolment result; and feeding back the recognition and enrolment result to the MGC.

An embodiment of the present disclosure provides a method for controlling speech recognition and enrolment, including: sending a Speech Enrolment Start Request and a Speech Recognition Request to an MG; and receiving a recognition and enrolment result fed back by the MG after the MG performs speech recognition and enrolment according to the Speech Enrolment Start Request and the Speech Recognition Request.

An embodiment of the present disclosure provides an MG, including: a receiving module, configured to receive a Speech Enrolment Start Request and a Speech Recognition Request from an MGC; a speech recognizing and enrolling module, configured to perform speech recognition and enrolment according to the Speech Enrolment Start Request and the Speech Recognition Request, and obtain a recognition and enrolment result; and a feedback module, configured to feed back the recognition and enrolment result obtained by the speech recognizing and enrolling module to the MGC.

An embodiment of the present disclosure provides an MGC, including: a sending module, configured to send a Speech Enrolment Start Request and a Speech Recognition Request to an MG; and a result receiving module, configured to receive a recognition and enrolment result fed back by the MG after the MG performs speech recognition and enrolment according to the Speech Enrolment Start Request and the Speech Recognition Request.

An embodiment of the present disclosure provides a system for speech recognition and enrolment, including an MGC and an MG, where: the MGC is configured to send a Speech Recognition Request to the MG after sending a Speech Enrolment Start Request to the MG; and receive a recognition and enrolment result fed back by the MG after the MG performs speech recognition and enrolment according to the Speech Enrolment Start Request and the Speech Recognition Request; and the MG is configured to receive the Speech Recognition Request from the MGC after receiving the Speech Enrolment Start Request from the MGC; perform speech recognition and enrolment according to the Speech Enrolment Start Request and the Speech Recognition Request, and obtain the recognition and enrolment result; and feed back the recognition and enrolment result to the MGC.

In the embodiments of the present disclosure, by receiving a Speech Enrolment Start Request and a Speech Recognition Request from the MGC, the MG may obtain the information carried in the Speech Enrolment Start Request and the Speech Recognition Request, and control the process of speech recognition and enrolment according to such information. In the process of speech recognition and enrolment, the MG may further obtain a corresponding recognition and enrolment result according to these parameters, and feed back the recognition and enrolment result to the MGC, so that the MGC controls subsequent enrolment processes according to the recognition and enrolment result. In the embodiments of the present disclosure, in an architecture where the MG is separate from the MGC, the MG can implement speech recognition and enrolment under the control of the MGC. Therefore, the technological gap in performing speech recognition and enrolment in an architecture where the MG is separate from the MGC is filled.

BRIEF DESCRIPTION OF THE DRAWINGS

To make the solutions in the embodiments of the present disclosure or the prior art clearer, the accompanying drawings used in the description of the embodiments of the present disclosure or the prior art are briefly described hereunder. Apparently, the accompanying drawings illustrate only some embodiments of the present disclosure, and persons of ordinary skill in the art can derive other drawings from such accompanying drawings without creative efforts.

DETAILED DESCRIPTION OF THE EMBODIMENTS

The solutions in the embodiments of the present disclosure are hereinafter described clearly and completely with reference to the accompanying drawings. Evidently, the described embodiments are only exemplary embodiments of the present disclosure and the present disclosure is not limited to such embodiments. Persons skilled in the art can derive other embodiments from the embodiments given herein without creative efforts, and all such embodiments are covered in the scope of the present disclosure.

Figure 2:
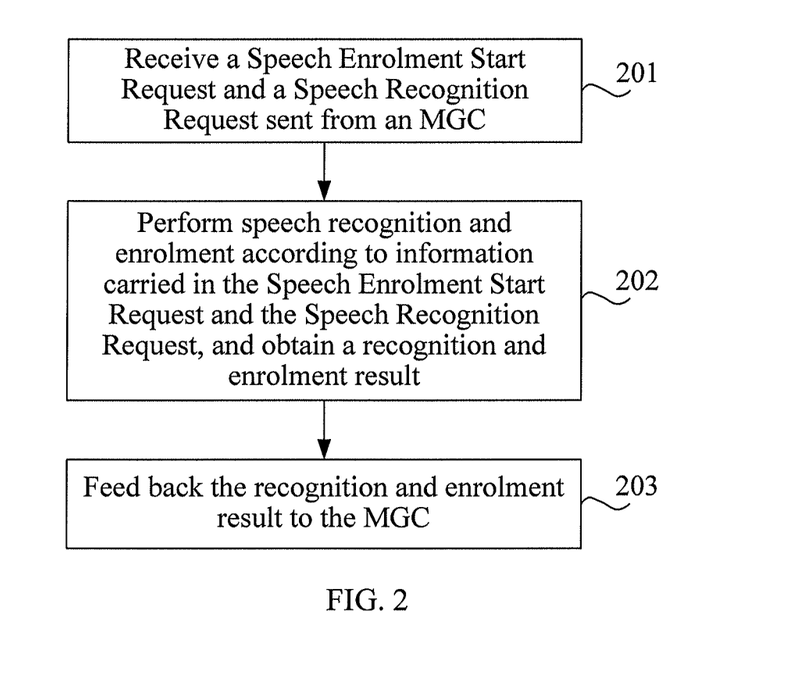
FIG. 2 is a flowchart of an embodiment of a method for performing speech recognition and enrolment according to the present disclosure.

FIG. 2 is a flowchart of an embodiment of a method for performing speech recognition and enrolment according to the present disclosure. As shown in FIG. 2, the method includes the following steps:

Step 201: Receive a Speech Enrolment Start Request and a Speech Recognition Request sent from an MGC.

For example, an MGC may send a Speech Enrolment Start Request to an MG through an extended H.248 signal, instructing the MG to start the speech recognition and enrolment. Information carried in the Speech Enrolment Start Request and used to control the speech recognition and enrolment may be stored in an extended protocol header field of the H.248 protocol. After the MG receives the Speech Enrolment Start Request, the MG may establish a corresponding enrolment session according to the information carried in the Speech Enrolment Start Request.

For example, the embodiment may extend a signal enrst in an existing H.248-based package or extended package, where the enrst is the abbreviation of enrolment start. When the MG receives the enrst signal, that is, when the MG receives the Speech Enrolment Start Request, the MG may trigger the establishment of an enrolment session for speech recognition. The MG may initialize operations related to the speech recognition and enrolment by using the information carried in the Speech Enrolment Start Request so as to control the process of the speech recognition and enrolment. For example, the information may include identity of a currently enrolled phrase, URI of a phrase grammar to be enrolled, number of consistent pronunciations needed in the enrolment process of a new phrase, consistency threshold, clash threshold, interpreted text that the MG returns to the UE after the phrase is recognized, likelihood of occurrence of a phrase in speech recognition and enrolment, and feeding back the URI of the waveform file to the MGC after the phrase enrolment is complete. Then, the MG may receive a Speech Recognition Request sent from the MGC, where the Speech Recognition Request may carry the following information: whether to add the collected utterance to the personal grammar, some command words that are not allowed to be used as enrolled phrases, and feeding back a recognition and enrolment result to the MGC after the recognition and enrolment are complete. The Speech Recognition Request instructs the MG to start enrolling a new utterance according to the information carried in the Speech Recognition Request. It should be noted that the foregoing Speech Enrolment Start Request may not carry the information but only triggers the MG to establish an enrolment session, while the Speech Recognition Request may carry all or some of the foregoing information and establish a speech recognition session, and in the process of the speech recognition session, the speech recognition and enrolment are performed according to the foregoing information, that is, the speech recognition process is also an enrolment process. Or, the Speech Enrolment Start Request carries all or some of the foregoing information, and triggers the MG to establish an enrolment session, while the Speech Recognition Request may not carry the information but only triggers the MG to establish a speech recognition session.

In addition, the MG may also receive an Enrolment Rollback Request, an End Phrase Enrolment Request, a Modify Phrase Request, and a Delete Phrase Request sent from the MGC so as to control the process of speech recognition and enrolment.

Step 202: Perform speech recognition and enrolment according to information carried in the Speech Enrolment Start Request and the Speech Recognition Request, and obtain a recognition and enrolment result.

For example, the speech recognition and enrolment may include speech recognition and speech enrolment. The speech recognition may be implemented by any one of technical means in the prior art, and is not described. The speech enrolment may be controlled by using the parameter information carried in the Speech Enrolment Start Request and the Speech Recognition Request, for example, feeding back the URI of the waveform file to the MGC after the phrase enrolment is complete, whether to add the collected utterance to the personal grammar, some command words that are not allowed to be used as enrolled phrases, and feeding back a recognition and enrolment result to the MGC after the recognition and enrolment are complete.

Step 203: Feed back the recognition and enrolment result to the MGC.

After the MG completes the recognition and enrolment of the phrase, the MG may feed back the recognition and enrolment result to the MGC. The recognition and enrolment result may be an enrolment failure or an enrolment success. The MG may report the enrolment success result by two parameter definition modes. One mode is to carry the recognition and enrolment result in a string through an extensible markup language (XML), for example, report by using a grammar reporting the recognition and enrolment result in the Media Resource Control Protocol (MRCP). The other mode is to report the specific information of the recognition and enrolment result in turn by extending multiple event parameters.

When the MGC receives the recognition and enrolment result reported by the MG, the MGC judges, according to the recognition and enrolment result, whether the enrolment process corresponding to the currently enrolled phrase already meets the requirement. If the requirement is met, the MGC may start enrolling a next phrase; otherwise, the MGC may continue enrolling the current phrase multiple times until the recognition and enrolment result of the current phrase meets the requirement.

In this embodiment, by receiving a Speech Enrolment Start Request sent from the MGC, the MG may establish an enrolment session according to the Speech Enrolment Start Request, and initialize subsequent speech recognition and enrolment so as to control the speech recognition and enrolment; by receiving a Speech Recognition Request sent from the MGC, the MG may perform speech enrolment in the speech recognition process according to the information carried in the Speech Recognition Request. The information carried in the Speech Enrolment Start Request and the Speech Recognition Request may be carried in an extended field of the H.248 protocol to form an H.248 signal. In addition, the information may be selected freely according to the actual requirement, so that the speech enrolment standard may be specified according to the actual requirement. The MG may perform speech recognition and enrolment according to the obtained information. In the process of speech recognition and enrolment, the MG may perform corresponding speech recognition and enrolment according to the information carried in the Speech Enrolment Start Request and the Speech Recognition Request sent from the MGC, obtain or record a related recognition and enrolment result, and feed back the recognition and enrolment result to the MGC, so that the MGC controls subsequent enrolment processes according to the recognition and enrolment result. In this embodiment, in an architecture where the MG is separate from the MGC, the MG can implement speech recognition and enrolment under the control of the MGC. Therefore, the technological gap in performing speech recognition and enrolment in an architecture where the MG is separate from the MGC is filled.

In another embodiment of the method for performing speech recognition and enrolment according to the present disclosure, the process of receiving a Speech Enrolment Start Request and a Speech Recognition Request sent from the MGC includes: receiving the Speech Enrolment Start Request sent from the MGC; and after an enrolment session is established according to the Speech Enrolment Start Request, receiving the Speech Recognition Request sent from the MGC. In still another embodiment of the method for performing speech recognition and enrolment according to the present disclosure, the process of performing speech recognition and enrolment according to the information carried in the Speech Enrolment Start Request and the Speech Recognition Request includes: initializing the speech recognition and enrolment according to the information carried in the Speech Enrolment Start Request; and performing speech recognition and enrolment according to the information carried in the Speech Recognition Request.

In still another embodiment of the method for performing speech recognition and enrolment according to the present disclosure, the method may further include the following steps:

Receive an Enrolment Rollback Request sent from the MGC, and according to the Enrolment Rollback Request, give up recording speech signals currently sent from the UE. For example, the Enrolment Rollback Request may be implemented by extending the H.248 signal enrrol, where the enrrol is the abbreviation of enrolment rollback. The enrrol signal may be used by the MGC to instruct the MG to give up recording speech signals that the UE sends currently, that is, the MGC instructs the MG to ignore the latest utterance that the speaker sends through the UE.

Receive an End Phrase Enrolment Request sent from the MGC, and according to the End Phrase Enrolment Request, start a new process of speech recognition and enrolment or abort the current process of speech recognition and enrolment. For example, the End Phrase Enrolment Request may be implemented by extending the H.248 signal epenr, where the epenr is the abbreviation of end phrase enrolment. The epenr signal is used by the MGC to instruct the MG to submit a latest phrase enrolment or abort the phrase enrolment abnormally. In the latter case, the enrolled phrase fails to be added to the personal grammar.

Receive a Modify Phrase Request sent from the MGC, and according to the Modify Phrase Request, modify phrase parameter information corresponding to phrases that need to be modified. For example, the Modify Phrase Request may be implemented by extending the H.248 signal modp, where the modp is the abbreviation of modifying phrase. The modp signal is used by the MGC to instruct the MG to modify the parameters in the personal grammar, where the parameters may be one or more of the phrase ID, natural language of the phrase, and weight.

Receive a Delete Phrase Request sent from the MGC, and according to the Delete Phrase Request, delete phrase parameter information corresponding to phrases that need to be deleted. For example, the Delete Phrase Request may be implemented by extending the H.248 signal delp, where the delp is the abbreviation of deleting phrase. The delp signal is used by the MGC to instruct the MG to delete one or more phrases from the personal grammar.

In the foregoing embodiments of the method for performing speech recognition and enrolment according to the present disclosure, the Speech Enrolment Start Request and the Speech Recognition Request may be received through an H.248 signal. It should be noted that the Speech Recognition Request may also reuse the existing speech recognition signal, and may be implemented by extending a corresponding parameter in the existing speech recognition signal.

In the foregoing embodiments of the present disclosure, in an architecture where the MG is separate from the MGC, the MG can implement speech recognition and enrolment under the control of the MGC. Therefore, the technological gap in performing speech recognition and enrolment in an architecture where the MG is separate from the MGC is filled.

Figure 3:
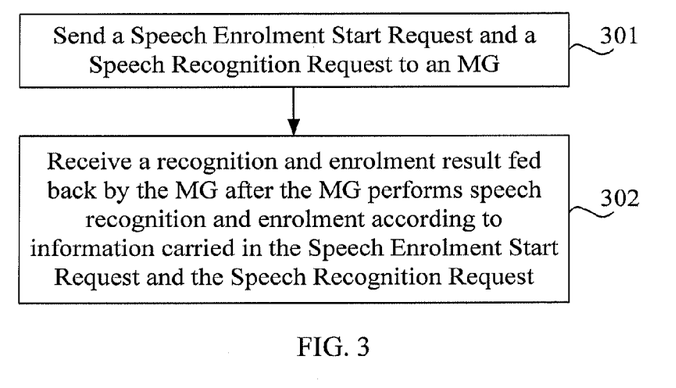
FIG. 3 is a flowchart of an embodiment of a method for controlling speech recognition and enrolment according to the present disclosure.

FIG. 3 is a flowchart of an embodiment of a method for controlling speech recognition and enrolment according to the present disclosure. As shown in FIG. 3, the method includes the following steps:

Step 301: Send a Speech Enrolment Start Request and a Speech Recognition Request to an MG.

For example, an MGC may send a Speech Enrolment Start Request to an MG through an extended H.248 signal, instructing the MG to start the speech recognition and enrolment. Information carried in the Speech Enrolment Start Request may be stored in an extended protocol header field of the H.248 protocol. After the MG receives the Speech Enrolment Start Request, the MG may establish a corresponding enrolment session according to the carried information.

For example, the embodiment may extend a signal enrst in an existing H.248-based package or extended package, where the enrst is the abbreviation of enrolment start. When the MG receives the enrst signal, that is, when the MG receives the Speech Enrolment Start Request, the MG may trigger the establishment of an enrolment session for speech recognition. The MG may initialize operations related to the speech recognition and enrolment by using the information carried in the Speech Enrolment Start Request so as to control the process of the speech recognition and enrolment. For example, the information may include identity of a currently enrolled phrase, URI of a phrase grammar to be enrolled, number of consistent pronunciations needed in the enrolment process of a new phrase, consistency threshold, clash threshold, interpreted text that the MG returns to the UE after the phrase is recognized, likelihood of occurrence of a phrase in speech recognition and enrolment, and feeding back the URI of the waveform file to the MGC after the phrase enrolment is complete. Then, the MG may receive a Speech Recognition Request sent from the MGC, where the Speech Recognition Request may carry the following information: whether to add the collected utterance to the personal grammar, some command words that are not allowed to be used as enrolled phrases, and feeding back a recognition and enrolment result to the MGC after the recognition and enrolment are complete. The Speech Recognition Request instructs the MG to start enrolling a new utterance according to the information carried in the Speech Recognition Request. It should be noted that the foregoing Speech Enrolment Start Request may not carry the information but only triggers the MG to establish an enrolment session, while the Speech Recognition Request may carry all of the foregoing information and establish a speech recognition session, and in the process of the speech recognition session, the speech recognition and enrolment are performed according to the foregoing information, that is, the speech recognition process is also an enrolment process. Or, the Speech Enrolment Start Request carries all of the foregoing information, and triggers the MG to establish an enrolment session, while the Speech Recognition Request may not carry the information but only triggers the MG to establish a speech recognition session.

In addition, the MG may also receive an Enrolment Rollback Request, an End Phrase Enrolment Request, a Modify Phrase Request, and a Delete Phrase Request sent from the MGC so as to control the process of speech recognition and enrolment.

Step 302: Receive a recognition and enrolment result fed back by the MG after the MG performs speech recognition and enrolment according to information carried in the Speech Enrolment Start Request and the Speech Recognition Request.

For example, after the MG completes the recognition and enrolment of the phrase, the MG may feed back the recognition and enrolment result to the MGC. The recognition and enrolment result may be an enrolment failure or an enrolment success. The enrolment success result may be reported by two parameter definition modes. One mode is to carry the recognition and enrolment result in a string through the XML, for example, report by using a grammar reporting the recognition and enrolment result in the MRCP. The other mode is to report the specific information of the recognition and enrolment result in turn by extending multiple event parameters. When the MGC receives the recognition and enrolment result reported by the MG, the MGC judges, according to the recognition and enrolment result, whether the enrolment process corresponding to the currently enrolled phrase already meets the requirement. If the requirement is met, the MGC may start enrolling a next phrase; otherwise, the MGC may continue enrolling the current phrase multiple times until the recognition and enrolment result of the current phrase meets the requirement.

In this embodiment, the MGC may establish an enrolment session with the MG by sending a Speech Enrolment Start Request to the MG, and initialize subsequent speech recognition and enrolment so as to control the speech recognition and enrolment. Then, the MGC establishes a speech recognition session with the MG by sending a Speech Recognition Request to the MG, so that the MG performs speech enrolment and controls the speech recognition and enrolment according to the information carried in the Speech Recognition Request in the speech recognition process. The information carried in the Speech Enrolment Start Request and the Speech Recognition Request may be carried in an extended field of the H.248 protocol to form an H.248 signal. In addition, the information may be selected freely according to the actual requirement, so that the speech enrolment standard may be specified according to the actual requirement. The MGC may control subsequent enrolment processes according to the recognition and enrolment result received from the MG. In this embodiment, in an architecture where the MG is separate from the MGC, the MGC can control the MG to perform speech recognition and enrolment operations. Therefore, the technological gap in performing speech recognition and enrolment in an architecture where the MG is separate from the MGC is filled.

In another embodiment of the method for controlling speech recognition and enrolment according to the present disclosure, the process of sending a Speech Enrolment Start Request and a Speech Recognition Request to the MG includes: sending the Speech Enrolment Start Request to the MG; and after the MG establishes an enrolment session according to the Speech Enrolment Start Request, sending the Speech Recognition Request to the MG.

In still another embodiment of the method for controlling speech recognition and enrolment according to the present disclosure, the method further includes the following steps:

Send an Enrolment Rollback Request to the MG, so that according to the Enrolment Rollback Request, the MG gives up recording speech signals currently sent from the UE. For example, the Enrolment Rollback Request may be implemented by extending the H.248 signal enrrol, where the enrrol is the abbreviation of enrolment rollback. The enrrol signal may be used by the MGC to instruct the MG to give up recording speech signals that the UE sends currently, that is, the MGC instructs the MG to ignore the latest utterance that the speaker sends through the UE.

Send an End Phrase Enrolment Request to the MG, so that according to the End Phrase Enrolment Request, the MG starts a new process of speech recognition and enrolment or aborts the current process of speech recognition and enrolment. For example, the End Phrase Enrolment Request may be implemented by extending the H.248 signal epenr, where the epenr is the abbreviation of end phrase enrolment. The epenr signal is used by the MGC to instruct the MG to submit a latest phrase enrolment or abort the phrase enrolment abnormally. In the latter case, the enrolled phrase fails to be added to the personal grammar.

Send a Modify Phrase Request to the MG, so that according to the Modify Phrase Request, the MG modifies phrase parameter information corresponding to phrases that need to be modified. For example, the Modify Phrase Request may be implemented by extending the H.248 signal modp, where the modp is the abbreviation of modifying phrase. The modp signal is used by the MGC to instruct the MG to modify the parameters in the personal grammar, where the parameters may be one or more of the phrase ID, natural language of the phrase, and weight.

Send a Delete Phrase Request to the MG, so that according to the Delete Phrase Request, the MG deletes phrase parameter information corresponding to phrases that need to be deleted. For example, the Delete Phrase Request may be implemented by extending the H.248 signal delp, where the delp is the abbreviation of deleting phrase. The delp signal is used by the MGC to instruct the MG to delete one or more phrases from the personal grammar.

In the foregoing embodiments of the method for controlling speech recognition and enrolment according to the present disclosure, the Speech Enrolment Start Request and the Speech Recognition Request may be sent through an H.248 signal. It should be noted that the Speech Recognition Request may also reuse the existing speech recognition signal, and may be implemented by extending a corresponding parameter in the existing speech recognition signal.

In the foregoing embodiments of the present disclosure, in an architecture where the MG is separate from the MGC, the MG can implement speech recognition and enrolment under the control of the MGC. Therefore, the technological gap in performing speech recognition and enrolment in an architecture where the MG is separate from the MGC is filled.

To further describe the solutions provided in the foregoing embodiments of the present disclosure, the following describes the solutions of the present disclosure in detail with reference to a specific instance.

Figure 4:
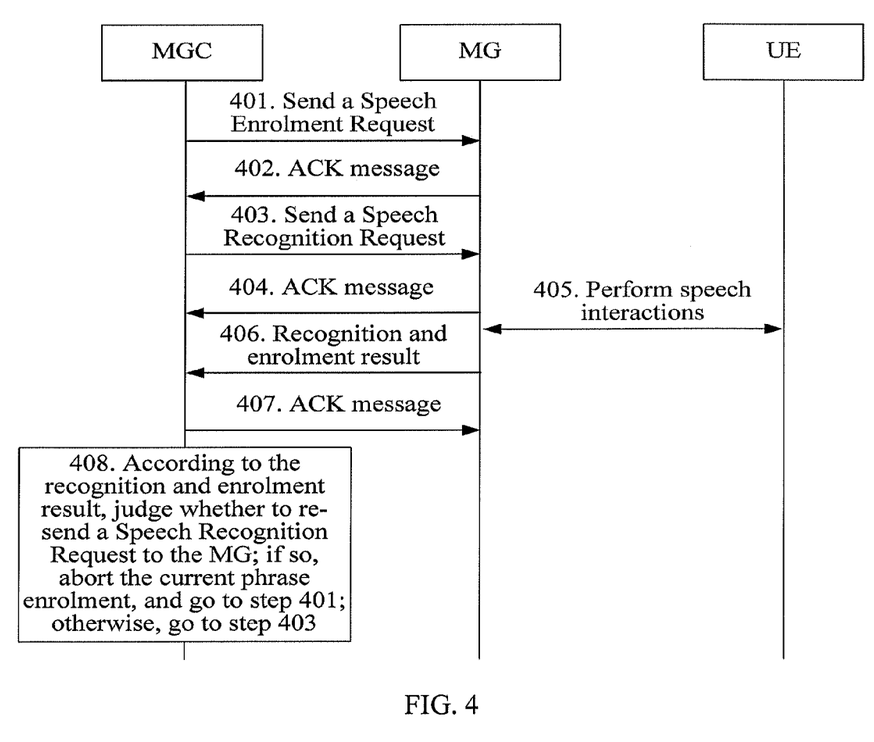
FIG. 4 is a signaling flowchart of an embodiment of a method according to the present disclosure.

FIG. 4 is a signaling flowchart of an embodiment of a method according to the present disclosure. As shown in FIG. 4, the method includes the following steps:

Step 401: The MGC sends a Speech Enrolment Start Request to the MG. The Speech Enrolment Start Request may carry speech enrolment information used to control the speech enrolment.

The MGC may send a Speech Enrolment Start Request to the MG through an extended H.248 signal, instructing the MG to start the speech recognition and enrolment. The information carried in the Speech Enrolment Start Request and used to control the speech enrolment may be stored in an extended protocol header field of the H.248 protocol. After the MG receives the Speech Enrolment Start Request, the MG may establish a corresponding enrolment session according to the speech enrolment parameter information carried in the Speech Enrolment Start Request. For example, the embodiment may extend a signal enrst in an existing H.248-based package or extended package. When the MG receives the enrst signal, that is, when the MG receives the Speech Enrolment Start Request, the MG may trigger the establishment of a speech enrolment session. The MG may initialize operations related to the speech enrolment by using the speech enrolment parameter information carried in the Speech Enrolment Start Request so as to control the speech enrolment process.

In this embodiment, the speech enrolment parameter information carried in the Speech Enrolment Start Request may include the following parameters:

(1) pgURI parameter

This parameter is a string parameter. The pgURI is the abbreviation of personal grammar uniform resource identifier. The speech recognition and enrolment include enrolment of one or more phrases. A speaker speaks a specified phrase multiple times, and the MG analyzes the waveform characteristics of the pronunciation of the speaker until the pronunciation can reach the recognizable standard, so that the pronunciation may be used in the subsequent speech recognition. The pgURI parameter stores the URI of the grammar of the phrase to be enrolled.

(2) mncp Parameter

This parameter is an integer parameter. The mncp is the abbreviation of minimum number of consistent pronunciations. When a new phrase is being enrolled, the enrolment must be performed until the pronunciation of the speaker can be recognized by the MG. The mncp parameter is used to indicate the minimum number of consistent pronunciations that must be reached in the process of enrolling a new phrase.

(3) cont Parameter

This parameter is an integer parameter. The cont is the abbreviation of consistency threshold. The value of the cont parameter ranges between 0 and 100. Because the H.248 protocol does not support floating-point numbers, the value of this parameter is used to represent a percentage. For example, if the value of this parameter is 10, it indicates 10%. This parameter is used to set how similar to a previously enrolled pronunciation of the same phrase an utterance needs to be in order to be considered "consistent".

(4) clat Parameter

This parameter is an integer parameter. The cont is the abbreviation of clash threshold. The value of the cont parameter ranges between 0 and 100. Because the H.248 protocol does not support floating-point numbers, the value of this parameter is used to represent a percentage. For example, if the value of this parameter is 10, it indicates 10%. This parameter is used to set how similar two different phrases can be. If the two phrases are too similar, the accuracy of the speech recognition may be affected.

(5) phaid Parameter

This parameter is a string parameter. The phaid is the abbreviation of phrase identity. This parameter is used to identify a phrase that is being enrolled.

(6) phaNL Parameter

This parameter is a string parameter. The phaNL is the abbreviation of phrase natural language. This parameter is used to indicate an interpreted text that the MG returns to the UE after a phrase is recognized.

(7) wei Parameter

This parameter is an integer parameter. The wei is the abbreviation of weight. This parameter is used to indicate the likelihood of occurrence of a phrase when the speech recognition and enrolment are performed.

(8) sbw Parameter

This parameter is a Boolean parameter. The sbw is the abbreviation of save best waveform. This parameter is used to instruct the MG to save the best audio waveform in the enrolment process. The MG returns the URI of the waveform file to the MGC after the phrase enrolment is complete.

According to the foregoing speech enrolment parameter information, the MG may initialize the operation information related to a current phrase that needs to recognized and enrolled. After the initialization is complete, the MG may control the subsequent enrolment process of the phrase.

Step 402: The MG sends an acknowledgement (ACK) message to the MGC.

In this step, the MG notifies the MGC of the fact that the enrolment session is already established.

Step 403: The MGC sends a Speech Recognition Request to the MG. The Speech Recognition Request may carry speech recognition parameter information used to control the speech recognition and enrolment.

By sending a Speech Recognition Request, the MGC instructs the MG to perform speech recognition. In a speech enrolment session, the process of speech recognition is also the process of speech enrolment. The speech recognition may be implemented by any one of means in the prior art, and is not described. However, for the additional speech enrolment demand, existing speech recognition signals may be reused to extend parameters, or a new H.248 signal may be generated to extend parameters. Therefore, the speech recognition parameter information may be stored in an extended protocol header field or a speech recognition signal of the H.248 protocol. In this embodiment, parameters are extended for the asrwgs signal of the existing easr package.

In this embodiment, the following new parameters are extended for the asrwgs signal:

(1) eu Parameter

This parameter is a Boolean parameter. The eu is the abbreviation of enroll utterance. The parameter is used to instruct the MG whether to add the collected utterance to the personal grammar.

(2) conph Parameter

This parameter is a string parameter. The conph is the abbreviation of confusable phrases. This parameter specifies some invalid phrases, for example, some command words that are not allowed to be used as enrolled phrases.

By using the foregoing speech recognition parameter information, the process of enrolling the current phrase can be controlled in the speech recognition process.

Step 404: The MG sends an ACK message to the MGC.

In this step, the MG notifies the MGC of the fact that the speech recognition session is already established.

Step 405: The MG performs speech interactions with the UE.

In step 405, the MG may perform speech recognition and enrolment with the speaker through the UE according to the parameter information related to the speech enrolment and speech recognition and obtained in step 401 and step 403. This process may be as follows: the speaker sends a speech signal to the MG through the UE, where the speech signal corresponds to a phrase identified by the phaid parameter; the MG obtains a grammar corresponding to the phrase by using the pgURI parameter, and judges how similar the speech signal and the grammar corresponding to the phrase can be by using the cont parameter so as to judge the consistency. Obviously, this process may also include other cases according to different parameter information. This interaction process may include a process in which the speaker interacts with the MG multiple times through the UE. In this way, multiple recognition and enrolment processes related to the phrase of the speaker currently being recognized and enrolled may be obtained. In addition, the MG may return an interpreted text to the UE according to the phaNL parameter after the phrase is recognized.

Step 406: The MG feeds back a recognition and enrolment result to the MGC.

After the MG completes the recognition and enrolment of the phrase, the MG may feed back the recognition and enrolment result to the MGC. The recognition and enrolment result may be an enrolment failure or an enrolment success. The enrolment success result may be reported by two parameter definition modes. One mode is to carry the recognition and enrolment result in a string through the XML, for example, report by using a grammar reporting the recognition and enrolment result in the MRCP. The other mode is to report the specific information of the recognition and enrolment result in turn by extending multiple event parameters.

For example, in step 406, when the MG reports an enrolment success and an enrolment failure, the MG may extend a new error code in an existing event used to report the speech recognition failure, where the error code is used to identify the enrolment failure result. Or the MG may extend an H.248-based enrolment results (enrres) event to report the enrolment result. Two possible solutions are available for defining the parameter of the enrres event. One solution is to define a string parameter to report all the enrolment result information as a whole. The other solution is to define multiple parameters to carry each piece of parameter information in the enrolment result. The parameter information may include but is not limited to the following parameters.

(1) numcla Parameter

This parameter is an integer parameter. The numcla is the abbreviation of number of clashes. This parameter is used to carry the number of clashes among pronunciations in this enrolment session.

(2) numgrep Parameter

This parameter is an integer parameter. The numgrep is the abbreviation of number of good repetitions. This parameter is used to carry the number of consistent pronunciations in this enrolment session.

(3) numrepsn Parameter

This parameter is an integer parameter. The numrepsn is the abbreviation of number of repetitions still needed. The numrepsn parameter is used to carry the number of consistent pronunciations still needed before the phrase can be added to the enrolment grammar in this enrolment.

(4) consta Parameter

This parameter is an enumeration parameter. The consta is the abbreviation of consistency status. This parameter has two possible states: consistent and inconsistent.

Step 407: The MGC sends an ACK message to the MG.

The ACK message indicates that the MGC receives the recognition and enrolment result.

Step 408: According to the recognition and enrolment result, the MGC judges whether to re-send a Speech Recognition Request to the MG. If so, the MGC aborts the current phrase enrolment, and the process goes to step 401; otherwise, the process goes to step 403.

The MGC may judge, according to the parameter information carried in the received recognition and enrolment result, whether the recognition and enrolment result meets the requirement, for example, it judges whether the enrolment accuracy and the number of enrolment times meet the requirement. If so, the MGC may start the enrolment process of a next phrase, that is, send a Speech Enrolment Start Request; otherwise, the MGC may re-send a Speech Recognition Request to the MG. By sending a Speech Recognition Request multiple times, the MGC instructs the MG to perform speech recognition on the same phrase multiple times until the MG obtains sufficient data information to ensure that the phrase of the speaker can be recognized.

In the process of speech recognition and enrolment, the MGC may also control the MG by using other signals. For example, the MGC may define a new signal enrrol to roll back the last enrolled utterance, or define a new signal epenr to end the enrolment of a phrase, or define signals to modify and delete an enrolled phrase. Details are omitted.

In this embodiment, some parameters carried in the Speech Enrolment Start Request and the Speech Recognition Request are listed. It is understandable that such parameters may be selected freely according to the actual requirement, so that the speech enrolment standard may be specified according to the actual requirement. In this embodiment, the MGC may control the speech recognition and enrolment by sending a Speech Enrolment Start Request and a Speech Recognition Request to the MG. The MGC may control subsequent enrolment processes according to the recognition and enrolment result received from the MG. In this embodiment, in an architecture where the MG is separate from the MGC, the MG can implement speech recognition and enrolment under the control of the MGC. Therefore, the technological gap in performing speech recognition and enrolment in an architecture where the MG is separate from the MGC is filled.

Figure 5:
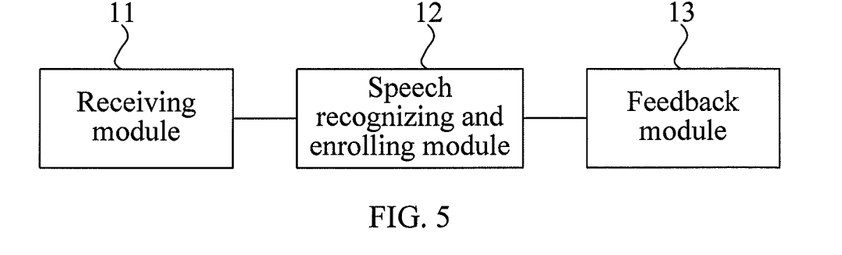
FIG. 5 is a schematic structure diagram of an embodiment of an MG according to the present disclosure.

FIG. 5 is a schematic structure diagram of an embodiment of an MG according to the present disclosure. As shown in FIG. 5, the MG includes: a receiving module 11, a speech recognizing and enrolling module 12, and a feedback module 13. The receiving module 11 is configured to receive a Speech Enrolment Start Request and a Speech Recognition Request sent from an MGC. The speech recognizing and enrolling module 12 is configured to perform speech recognition and enrolment according to information carried in the Speech Enrolment Start Request and the Speech Recognition Request received by the receiving module 11, and obtain a recognition and enrolment result. The feedback module 13 is configured to feed back the recognition and enrolment result obtained by the speech recognizing and enrolling module 12 to the MGC.

The MG provided in this embodiment corresponds to the embodiment of the method for performing speech recognition and enrolment in FIG. 2, and therefore the specific implementation principles of the MG are not further described.

Figure 6:
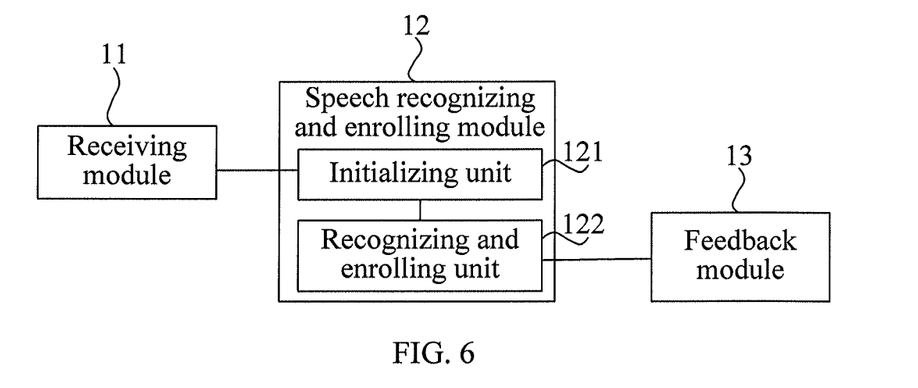
FIG. 6 is a schematic structure diagram of another embodiment of the MG according to the present disclosure.

FIG. 6 is a schematic structure diagram of another embodiment of the MG according to the present disclosure. As shown in FIG. 6, the MG includes: a receiving module 11, a speech recognizing and enrolling module 12, and a feedback module 13. The receiving module 11 is configured to receive a Speech Recognition Request sent from an MGC after receiving a Speech Enrolment Start Request sent from the MGC. The speech recognizing and enrolling module 12 is configured to perform speech recognition and enrolment according to information carried in the Speech Enrolment Start Request and the Speech Recognition Request received by the receiving module 11, and obtain a recognition and enrolment result. The feedback module 13 is configured to feed back the recognition and enrolment result obtained by the speech recognizing and enrolling module 12 to the MGC.

The speech recognizing and enrolling module 12 includes an initializing unit 121 and a recognizing and enrolling unit 122. The initializing unit 121 is configured to initialize the speech recognition and enrolment according to the information carried in the Speech Enrolment Start Request. The recognizing and enrolling unit 122 is configured to perform speech recognition and enrolment according to the information carried in the Speech Recognition Request.

Further, the MG provided in this embodiment may also include an enrolment rollback module, a phrase enrolment ending module, a phrase modifying module and/or a phrase deleting module. The enrolment rollback module is configured to receive an Enrolment Rollback Request sent from the MGC, and according to the Enrolment Rollback Request, give up recording speech signals currently sent from the UE. The phrase enrolment ending module is configured to receive an End Phrase Enrolment Request sent from the MGC, and according to the End Phrase Enrolment Request, start a new process of recognition and enrolment or abort the current process of recognition and enrolment. The phrase modifying module is configured to receive a Modify Phrase Request sent from the MGC, and according to the Modify Phrase Request, modify phrase parameter information corresponding to phrases that need to be modified. The phrase deleting module is configured to receive a Delete Phrase Request sent from the MGC, and according to the Delete Phrase Request, delete phrase parameter information corresponding to phrases that need to be deleted.

In the foregoing embodiment of the MG, by receiving a Speech Enrolment Start Request sent from the MGC, the receiving module may establish an enrolment session according to the Speech Enrolment Start Request; and the speech recognizing and enrolling module initializes subsequent speech recognition and enrolment. In this way, the speech recognition and enrolment are controlled. In addition, the receiving module receives a Speech Recognition Request sent from the MGC, so that the speech recognizing and enrolling module may perform a speech enrolment operation according to the information carried in the Speech Recognition Request in the speech recognition process. The information carried in the Speech Enrolment Start Request and the Speech Recognition Request may be carried in an extended field of the H.248 protocol to form an H.248 signal. In addition, the information may be selected freely according to the actual requirement, so that the speech enrolment standard may be specified according to the actual requirement. The MG may perform speech recognition and enrolment according to the obtained information. In the process of speech recognition and enrolment, the MG may perform corresponding speech recognition and enrolment according to the information carried in the Speech Enrolment Start Request and the Speech Recognition Request sent from the MGC, obtain or record a related recognition and enrolment result, and feed back the recognition and enrolment result to the MGC through the feedback module, so that the MGC controls subsequent enrolment processes according to the recognition and enrolment result. In this embodiment, in an architecture where the MG is separate from the MGC, the MG can implement speech recognition and enrolment under the control of the MGC. Therefore, the technological gap in performing speech recognition and enrolment in an architecture where the MG is separate from the MGC is filled.

Figure 7:
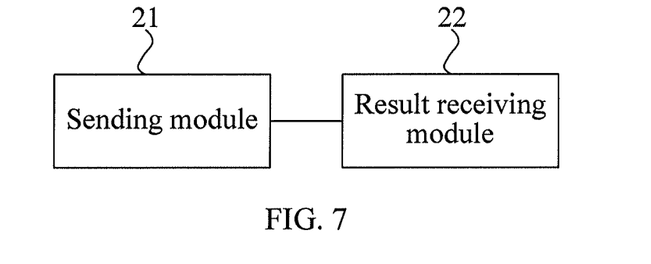
FIG. 7 is a schematic structure diagram of an embodiment of an MGC according to the present disclosure.

FIG. 7 is a schematic structure diagram of an embodiment of an MGC according to the present disclosure. As shown in FIG. 7, the MGC includes a sending module 21 and a result receiving module 22. The sending module 21 is configured to send a Speech Enrolment Start Request and a Speech Recognition Request to an MG. The result receiving module 22 is configured to receive a recognition and enrolment result fed back by the MG after the MG performs speech recognition and enrolment according to information carried in the Speech Enrolment Start Request and the Speech Recognition Request.

The MGC provided in this embodiment corresponds to the embodiment of the method for controlling speech recognition and enrolment in FIG. 3, and therefore the specific implementation principles of the MGC are not further described.

In another embodiment of the MGC according to the present disclosure, the sending module 21 is further configured to send an Enrolment Rollback Request to the MG, so that according to the Enrolment Rollback Request, the MG gives up recording speech signals currently sent from the UE; send an End Phrase Enrolment Request to the MG, so that according to the End Phrase Enrolment Request, the MG starts a new process of recognition and enrolment or aborts the current process of recognition and enrolment; send a Modify Phrase Request to the MG so that according to the Modify Phrase Request, the MG modifies phrase parameter information corresponding to phrases that need to be modified; and/or send a Delete Phrase Request to the MG, so that according to the Delete Phrase Request, the MG deletes phrase parameter information corresponding to phrases that need to be deleted.

In the foregoing embodiment of the MGC according to the present disclosure, the MGC may establish an enrolment session with the MG by sending a Speech Enrolment Start Request to the MG through the sending module, and initialize subsequent speech recognition and enrolment so as to control the speech recognition and enrolment. Then, the MGC establishes a speech recognition session with the MG by sending a Speech Recognition Request to the MG through the sending module, so that the MG performs speech enrolment and controls the speech recognition and enrolment according to the information carried in the Speech Recognition Request in the speech recognition process. The information carried in the Speech Enrolment Start Request and the Speech Recognition Request may be carried in an extended field of the H.248 protocol to form an H.248 signal. In addition, the information may be selected freely according to the actual requirement, so that the speech enrolment standard may be specified according to the actual requirement. The MGC may control subsequent enrolment processes according to the recognition and enrolment result that the result receiving module receives from the MG. In this embodiment, in an architecture where the MG is separate from the MGC, the MGC can control the MG to perform speech recognition and enrolment operations. Therefore, the technological gap in performing speech recognition and enrolment in an architecture where the MG is separate from the MGC is filled.

Figure 8:
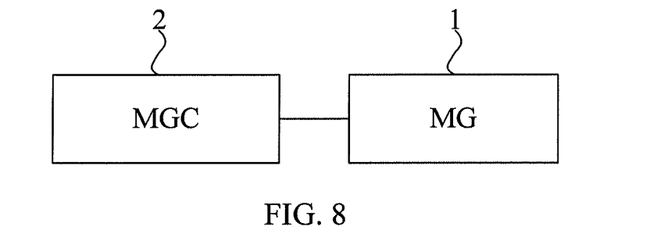
FIG. 8 is a schematic structure diagram of an embodiment of a system for speech recognition and enrolment according to the present disclosure.

FIG. 8 is a schematic structure diagram of an embodiment of a system for speech recognition and enrolment according to the present disclosure. As shown in FIG. 8, the system for speech recognition and enrolment includes an MGC 2 and an MG 1. The MGC 2 is configured to send a Speech Enrolment Start Request and a Speech Recognition Request to the MG 1; and receive a recognition and enrolment result fed back by the MG 1 after the MG 1 performs speech recognition and enrolment according to information carried in the Speech Enrolment Start Request and the Speech Recognition Request. The MG 1 is configured to receive the Speech Enrolment Start Request and the Speech Recognition Request sent from the MGC 2; perform speech recognition and enrolment according to the information carried in the Speech Enrolment Start Request and the Speech Recognition Request, and obtain the recognition and enrolment result; and feed back the recognition and enrolment result to the MGC 2.

The foregoing embodiment of the system for speech recognition and enrolment corresponds to the embodiment of the method shown in FIG. 4, and therefore the specific implementation principles of the system are not further described.

In the foregoing embodiment of the system for speech recognition and enrolment, the MGC may control the speech recognition and enrolment by sending a Speech Enrolment Start Request and a Speech Recognition Request to the MG. The MGC may control subsequent enrolment processes according to the recognition and enrolment result received from the MG. In this embodiment, in an architecture where the MG is separate from the MGC, the MG can implement speech recognition and enrolment under the control of the MGC. Therefore, the technological gap in performing speech recognition and enrolment in an architecture where the MG is separate from the MGC is filled. The MG may include at least a processor and storage medium accessible by the processor. The MGC may include at least a processor and storage medium accessible by the processor.

Finally, it should be noted that the above embodiments are merely provided for describing the solutions of the present disclosure, but not intended to limit the present disclosure. It should be understood by persons of ordinary skill in the art that although the present disclosure has been described in detail with reference to exemplary embodiments, modifications or equivalent replacements can be made to the solutions of the present disclosure, as long as such modifications or replacements do not depart from the spirit and scope of the present disclosure.

What is claimed is:

1. A method for performing speech recognition and enrollment, comprising:
    receiving, by a media gateway (MG), a Speech Enrollment Start Request for triggering a grammar enrollment session from a media gateway controller (MGC);
    after receiving the Speech Enrollment Start Request, establishing, by the MG, the grammar enrollment session according to the Speech Enrollment Start Request;
    receiving, by the MG, a Speech Recognition Request instructing the MG to enroll a phrase in a grammar associated with the grammar enrollment session, from the MGC after the grammar enrollment session is established;
    performing, by the MG, an enrollment for the phrase according to the Speech Recognition Request; and
    sending, by the MG, an enrollment result to the MGC,
    wherein the enrollment result is carried in a parameter of an Enrollment Results event of an H.248 protocol, the enrollment result comprises information indicating the number of consistent pronunciations that must still be obtained before the phrase is added to the grammar.

2. The method according to claim 1, wherein the number of consistent pronunciations that must still be obtained before the phrase is added to the grammar is zero, the method further comprises:
    receiving, by the MG, an End Phrase Enrollment Request from the MGC, and according to the End Phrase Enrollment Request, adding the phrase in the grammar associated with the grammar enrollment session.

3. The method according to claims 1, wherein the Speech Enrollment Start Request is received through an enrollment start signal of an H.248 protocol.

4. The method according to claim 3, wherein the Speech Recognition Request is received through a header field or a speech recognition signal of the H.248 protocol.

5. A method for controlling speech recognition and enrollment, comprising:
    sending, by a media gateway controller (MGC), a Speech Enrollment Start Request according to which a media gateway (MG) establishes a grammar enrollment session;
    after the grammar enrollment session is established, sending, by the MGC, a Speech Recognition Request instructing the MG to enroll a phrase in a grammar associated with the grammar enrollment session, to the MG; and
    receiving, by the MGC, an enrollment result sent from the MG,
    wherein the enrollment result is carried in a parameter of an Enrollment Results event of an H.248 protocol, the parameter comprises information indicating the number of consistent pronunciations that must still be obtained before the phrase is added to the grammar.

6. The method according to claim 5, further comprising:
    determining, by the MGC, that the number of consistent pronunciations that still be obtained before the phrase is added to the grammar is zero; and
    sending, by the MGC, an End Phrase Enrollment Request to the MG to instruct the MG to add the phrase in the grammar associated with the grammar enrollment session.

7. The method according to claims 5, wherein the Speech Enrollment Start Request is sent through an enrollment start signal of the H.248 protocol.

8. A media gateway (MG), comprising:
a processor; and
a memory having a plurality of instructions stored thereon which, when executed by the processor, cause the processor to implement operations comprising:
receiving a Speech Enrollment Start Request from a media gateway controller (MGC);
establishing a grammar enrollment session according to the Speech Enrollment Start Request;
receiving a Speech Recognition Request instructing the MG to enroll a phrase in a grammar associated with the grammar enrollment session, which is sent from the MGC after the grammar enrollment session is established;
performing an enrollment for the phrase according to the Speech Recognition Request; and
sending an enrollment result to the MGC,
wherein the enrollment result is carried in a parameter of an Enrollment Results event of an H.248 protocol, the parameter comprises information indicating the number of consistent pronunciations that must still be obtained before the phrase is added to the grammar.

9. The MG according to claim 8, wherein the number of consistent pronunciations that must still be obtained before the phrase is added to the grammar is zero, the operations further comprises:
receiving an End Phrase Enrollment Request from the MGC, and according to the End Phrase Enrollment Request, adding the phrase in the grammar associated with the grammar enrollment session.

10. A media gateway controller (MGC), comprising:
a processor; and
a memory having a plurality of instructions which, when executed by the processor, cause the processor to implement operations comprising:
sending a Speech Enrollment Start Request according to which a media gateway (MG) establishes a grammar enrollment session;
sending a Speech Recognition Request instructing the MG to enroll a phrase in a grammar associated with the grammar enrollment session to the MG, after the grammar enrollment session is established; and
receiving an enrollment result sent from the MG,
wherein the enrollment result is carried in a parameter of an Enrollment Results event of an H.248 protocol, the parameter comprises information indicating the number of consistent pronunciations that must still be obtained before the phrase is added to the grammar.

11. The MGC according to claim 10, wherein the operations further comprise:
determining that the number of consistent pronunciations that must still be obtained before the phrase is added to the grammar is zero; and
sending an End Phrase Enrollment Request to the MG, the End Phrase Enrollment Request instructing the MG to add the phrase in the grammar associated with the grammar enrollment session.

12. A system comprising a media gateway controller (MGC) and a media gateway (MG), wherein:
the MGC is configured to send a Speech Enrollment Start Request for triggering a grammar enrollment session, and a Speech Recognition Request instructing the MG to enroll a phrase in a grammar associated with the grammar enrollment session, to the MG,
the MG is configured to:
receive the Speech Enrollment Start Request and establish the grammar enrollment session according to the Speech Enrollment Start Request;
perform an enrollment for the phrase according to the Speech Recognition Request; and
send an enrollment result to the MGC,
wherein the enrollment result is carried in a parameter of an Enrollment Results event of an H.248 protocol, the parameter comprises information indicating the number of consistent pronunciations that must still be obtained before the phrase is added to the grammar.

\* \* \* \* \*